United States Patent
Choi

(10) Patent No.: US 11,953,205 B2
(45) Date of Patent: Apr. 9, 2024

(54) SWIRLER WITH FUEL MANIFOLD, AND COMBUSTOR AND GAS TURBINE INCLUDING THE SAME

(71) Applicant: DOOSAN ENERBILITY CO., LTD., Changwon-si (KR)

(72) Inventor: In Chan Choi, Gwangyang-si (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 237 days.

(21) Appl. No.: 16/880,679

(22) Filed: May 21, 2020

(65) Prior Publication Data

US 2020/0393130 A1 Dec. 17, 2020

(30) Foreign Application Priority Data

Jun. 11, 2019 (KR) .................. 10-2019-0068872

(51) Int. Cl.
*F23R 3/28* (2006.01)
*F02C 7/22* (2006.01)
*F23R 3/10* (2006.01)
*F23R 3/14* (2006.01)

(52) U.S. Cl.
CPC .............. *F23R 3/286* (2013.01); *F02C 7/222* (2013.01); *F23R 3/10* (2013.01); *F23R 3/14* (2013.01)

(58) Field of Classification Search
CPC ... F23R 3/14; F23R 3/286; F23C 2900/07001
See application file for complete search history.

(56) References Cited

U.S. PATENT DOCUMENTS

| 7,171,813 B2 | 2/2007 | Tanaka |
| 7,490,471 B2 | 2/2009 | Lynch et al. |
| 9,046,262 B2* | 6/2015 | Kim ................. F23C 7/004 |
| 2010/0077760 A1* | 4/2010 | Laster .............. F23R 3/286 60/742 |

(Continued)

FOREIGN PATENT DOCUMENTS

| CN | 1399100 A | 2/2003 |
| CN | 1472425 A | 2/2004 |
| CN | 102165253 A | 8/2011 |

(Continued)

OTHER PUBLICATIONS

I.E.. Idelcchik, Handbook of Hydraulic Resistance, U. S. Atomic Energy Commission and the National Science Foundation. (Year: 1966).*

(Continued)

*Primary Examiner* — Katheryn A Malatek
*Assistant Examiner* — Jingchen Liu
(74) *Attorney, Agent, or Firm* — Harvest IP Law, LLP

(57) ABSTRACT

A swirler with a fuel manifold, and a combustor and gas turbine including the same are provided. The swirler may include a swirler body disposed between an inner surface of a fuel nozzle and an outer surface of a center body, a fuel injection hole disposed on the swirler body, a fuel manifold formed in the swirler body, the fuel manifold being connected to a fuel channel disposed in the center body while communicating with the fuel injection hole, and a turbulence alleviator formed at a fuel inlet of the fuel manifold to alleviate creation of turbulence of fuel flowing from the fuel channel to the fuel manifold.

5 Claims, 5 Drawing Sheets

(56) References Cited

U.S. PATENT DOCUMENTS

2016/0186662 A1* 6/2016 Stewart ................ F23R 3/14
                                                                                      239/403

FOREIGN PATENT DOCUMENTS

| CN | 105164384 A | 12/2015 |
| CN | 205481129 U | 8/2016 |
| CN | 106066048 A | 11/2016 |
| CN | 108072054 A | 5/2018 |
| JP | H10318541 A | 12/1998 |

OTHER PUBLICATIONS

CN OA dated Oct. 28, 2021.
DE OA dated May 17, 2021.
CN OA dated Mar. 18, 2022.
CN Office Action dated May 24, 2022.
City Underground Space Ventilation and Drainage, Sep. 2018.

* cited by examiner

Prior Art
[FIG. 1]
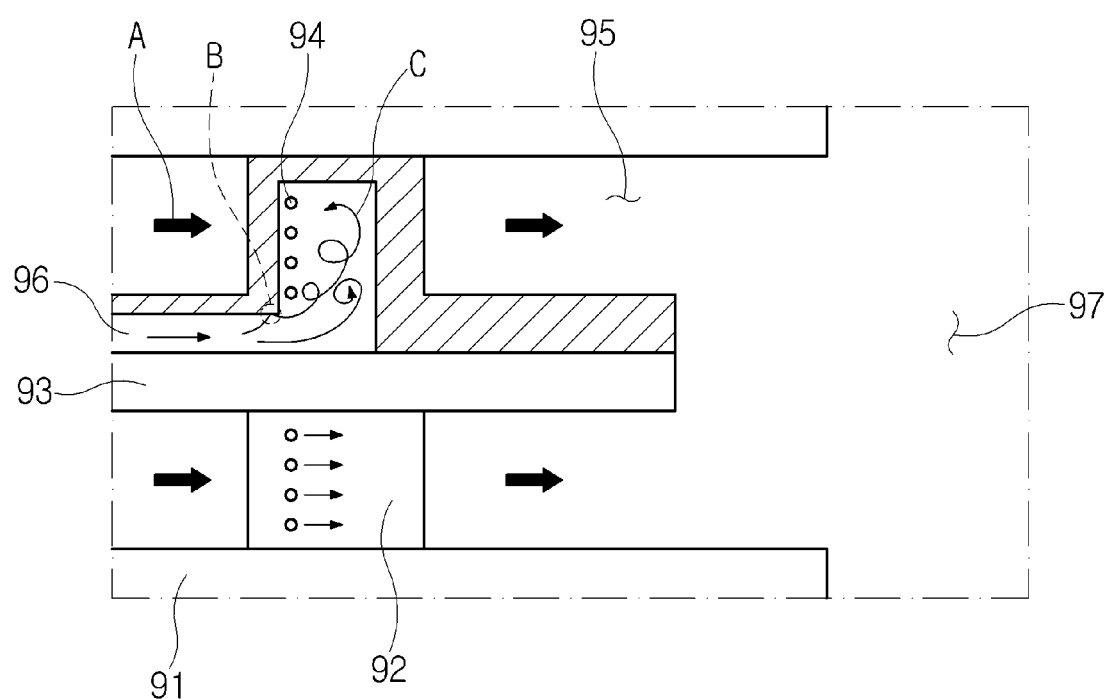

[FIG. 2]
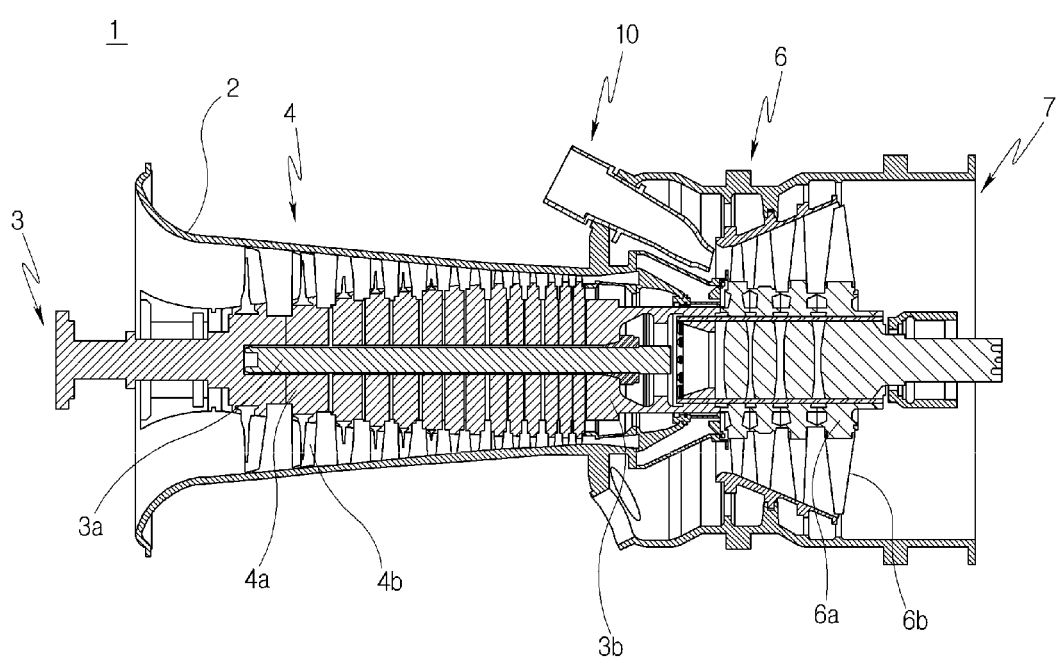

[FIG. 3]
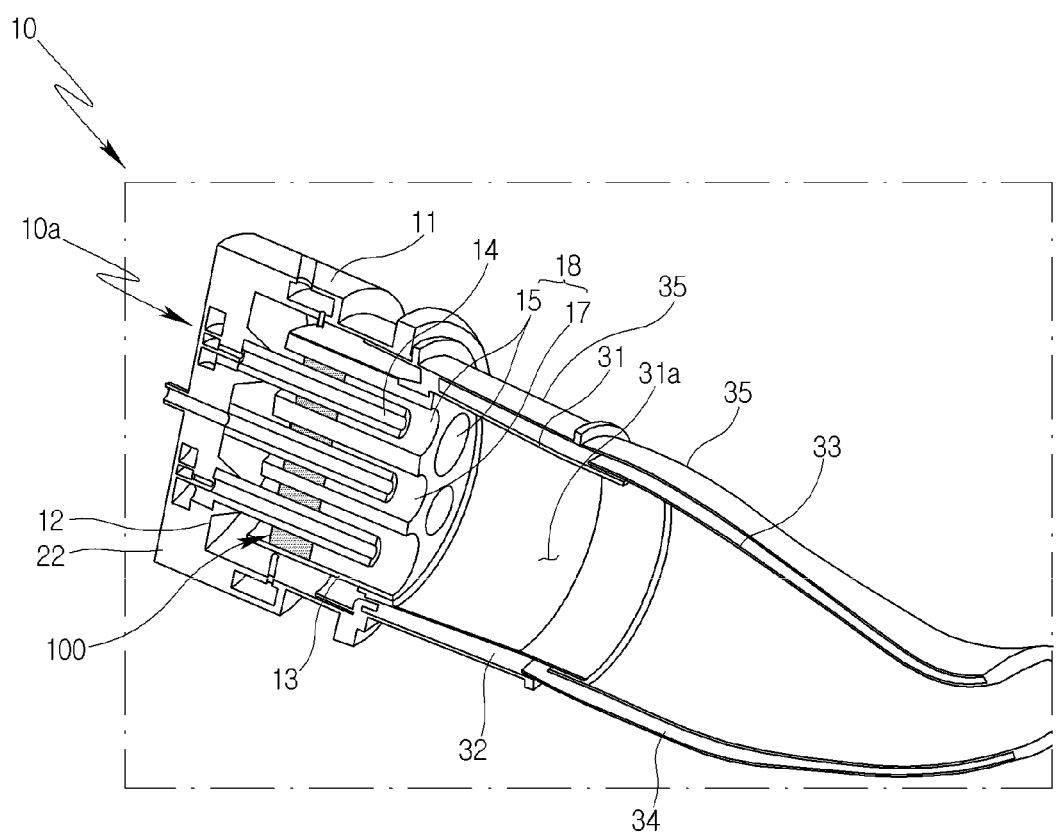

[FIG. 4]
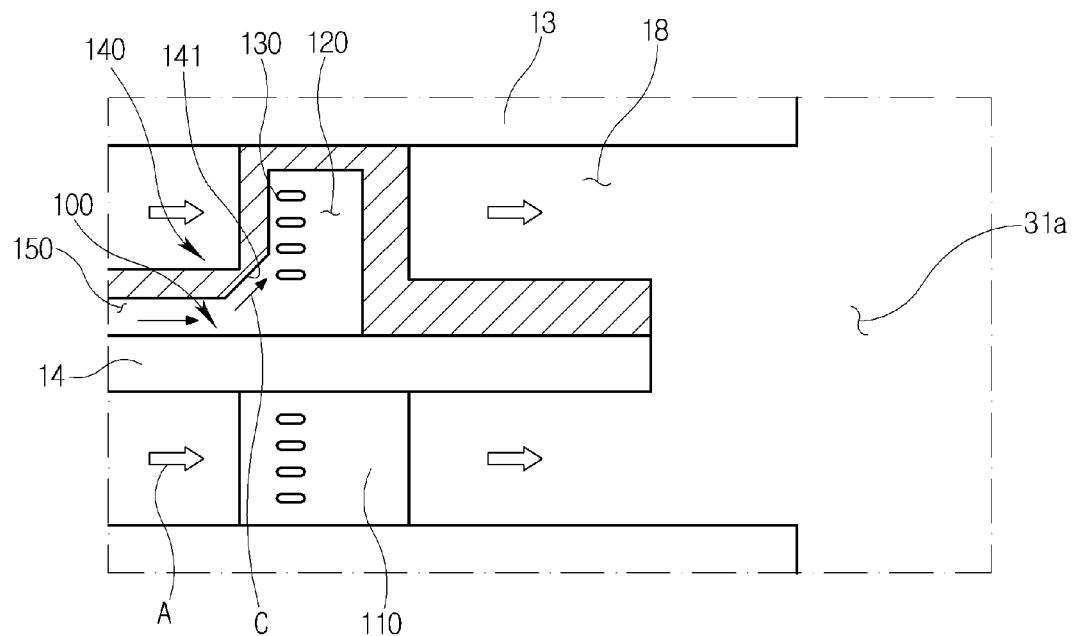
[FIG. 5]
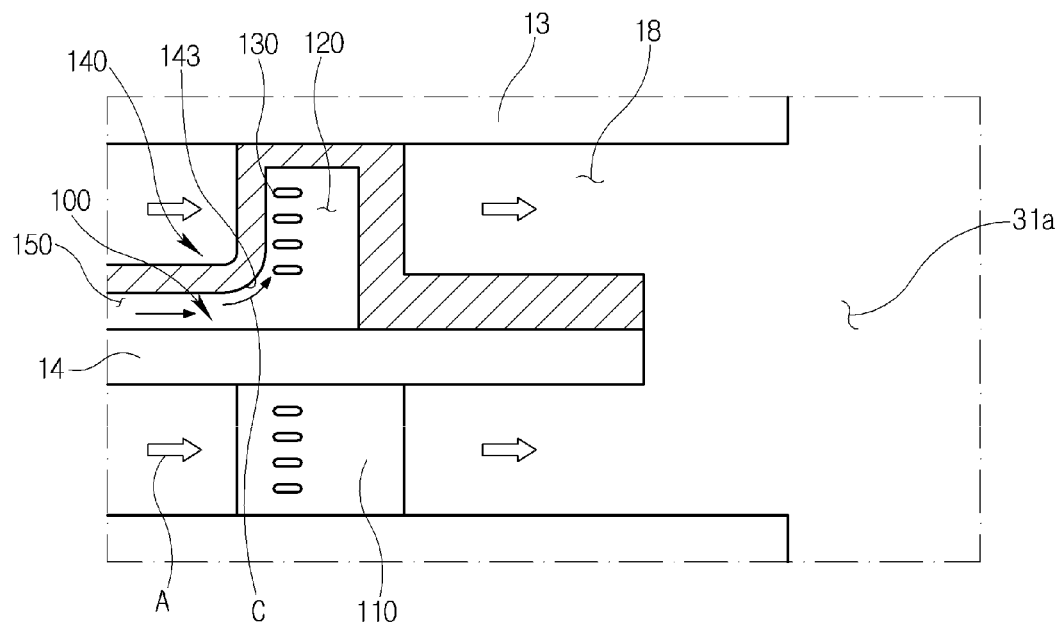

SWIRLER WITH FUEL MANIFOLD, AND COMBUSTOR AND GAS TURBINE INCLUDING THE SAME

CROSS-REFERENCE TO RELATED APPLICATION

This application claims priority to Korean Patent Application No. 10-2019-0068872, filed on Jun. 11, 2019, the disclosure of which is incorporated herein by reference in its entirety.

BACKGROUND

Technical Field

Apparatuses consistent with exemplary embodiments relate to a swirler with a fuel manifold, and a combustor and gas turbine including the same, and more particularly, to a swirler that enables stable injection of fuel by designing a structure that minimizes a creation of turbulence of the fuel in a fuel manifold disposed within the swirler, and a combustor and gas turbine including the same.

Description of the Related Art

A gas turbine is a power generation apparatus that converts a thermal energy of a fluid, such as gas or steam, into a rotational force as a mechanical energy, and includes a rotor having a plurality of buckets arranged to axially rotate the rotor by the force of the fluid flowing through the buckets, and a casing installed to surround the rotor and having a plurality of diaphragms.

In general, a gas turbine includes a compressor, a combustor, and a turbine. The compressor draws an outside air thereinto, compresses the air, and then transmits the compressed air to the combustor in which the compressed air is mixed with fuel for combustion. The high-temperature and high-pressure gas produced in the combustor is used to drive a generator by rotating turbine rotors while passing through the turbine.

The combustor of the gas turbine injects fuel into the air compressed by the compressor to mix them for combustion in a combustion chamber. When the mixture of air and fuel is supplied to the combustion chamber, it is important to increase a degree of mixing of air and fuel. Improving the degree of mixing of air and fuel reduces combustion vibration during combustion in the combustion chamber, resulting in an enhancement in overall power generation efficiency of the gas turbine.

A stable injection of fuel through fuel injection holes of swirlers also serves to increase the degree of mixing of air and fuel. FIG. 1 illustrates a related art swirler structure. Referring to FIG. 1, tubular fuel nozzles 95 are respectively arranged in a plurality of hollow portions formed in a nozzle tube 91, and a center body 93 connected to a nozzle base (not illustrated) is disposed at a center of each of the fuel nozzles 95.

In addition, a plurality of swirlers 92 are spaced at predetermined interval between an outer surface of the center body 93 and an inner surface of the fuel nozzle 95, so as to swirl and supply compressed air to a combustion chamber 97. A plurality of fuel injection holes 94 are arranged on a surface of each of the swirlers 92. The fuel injection holes 94 communicate with a manifold space that is connected to a fuel channel 96 formed in the center body 93 so that fuel flows through the fuel channel 96.

The fuel introduced through the fuel channel 96 flows into the individual fuel injection holes 94 in the manifold space and is injected out of the swirlers 92 to mix with compressed air.

In the related art, an entry portion B of the manifold space is angular due to machining, which causes a collision and thus poor flow of fuel when the fuel passes through the entry portion B. Consequentially, a turbulence C is created in the manifold space, which interrupts the stable flow of fuel into the fuel injection holes 94 and ultimately has an adverse influence on a degree of mixing of fuel and air.

SUMMARY

Aspects of one or more exemplary embodiments provide a swirler that enables stable injection of fuel by designing a structure that minimizes a creation of turbulence of the fuel in a fuel manifold disposed within the swirler, and a combustor and gas turbine including the same.

Additional aspects will be set forth in part in the description which follows and, in part, will become apparent from the description, or may be learned by practice of the exemplary embodiments.

According to an aspect of an exemplary embodiment, there is provided a swirler including: a swirler body disposed between an inner surface of a fuel nozzle and an outer surface of a center body, a fuel injection hole disposed on the swirler body, a fuel manifold formed in the swirler body, the fuel manifold being connected to a fuel channel disposed in the center body while communicating with the fuel injection hole, and a turbulence alleviator formed at a fuel inlet of the fuel manifold to alleviate creation of turbulence of fuel flowing from the fuel channel to the fuel manifold.

The turbulence alleviator may include an inclined portion formed at the fuel inlet of the fuel manifold so that a flow space of the fuel is gradually enlarged from the fuel channel to the fuel manifold.

The turbulence alleviator may include a curved portion formed at the fuel inlet of the fuel manifold so that a flow space of the fuel is gradually enlarged from the fuel channel to the fuel manifold.

The fuel injection hole may be an elongated hole extending in a direction of flow of compressed air.

According to an aspect of another exemplary embodiment, there is provided a swirler including: a swirler body disposed between an inner surface of a fuel nozzle, in which compressed air flows toward a combustion chamber, and an outer surface of a center body, a fuel injection hole disposed on the swirler body, a fuel manifold formed in the swirler body, the fuel manifold being connected to a fuel channel disposed in the center body while communicating with the fuel injection hole, and a turbulence alleviator formed in the fuel manifold to alleviate creation of turbulence of fuel flowing from the fuel channel to the fuel manifold.

The swirler body may include an upper portion extending from the inner surface of the fuel nozzle to the outer surface of the center body in a direction opposite to the combustion chamber, based on the direction of flow of the compressed air.

The turbulence alleviator may include an inclined blade portion inclined in a direction of extension of the upper portion of the swirler body so that the fuel flowing from the fuel channel to the fuel manifold is diffused without a creation of turbulence and distributed to the fuel injection hole.

The turbulence alleviator may further include a curved portion formed at a fuel inlet of the fuel manifold so that a flow space of the fuel is gradually enlarged from the fuel channel to the fuel manifold.

The fuel injection hole may include a first injection hole disposed in an upper portion of the fuel manifold, based on the direction of flow of the fuel.

The fuel injection hole may further include a second injection hole disposed in a lower portion of the fuel manifold, based on the direction of flow of the fuel.

The swirler body may include an upper portion extending from the inner surface of the fuel nozzle to the outer surface of the center body in the direction opposite to the combustion chamber, based on the direction of flow of the fuel.

The turbulence alleviator may include a first curved blade portion curved in a direction of extension of the upper portion of the swirler body so that the fuel flowing from the fuel channel to the fuel manifold is diffused without a creation of turbulence and distributed to the first injection hole.

The swirler body may include a lower portion extending from the inner surface of the fuel nozzle to the outer surface of the center body in a direction toward the combustion chamber, based on the direction of flow of the fuel.

The turbulence alleviator may further include a second curved blade portion curved in a direction of extension of the lower portion of the swirler body so that the fuel flowing from the upper portion of the fuel manifold to the lower portion of the fuel manifold is diffused without a creation of turbulence and distributed to the second injection hole.

The fuel injection hole may be an elongated hole extending in a direction of flow of the compressed air.

According to an aspect of another exemplary embodiment, there is provided a gas turbine including: a casing, a compressor section disposed in the casing and configured to compress air, a combustor connected to the compressor section in the casing and configured to combust a mixture of fuel with the compressed air, a turbine section connected to the combustor in the casing and configured to generate power using combustion gas generated by the combustor, and a diffuser connected to the turbine section in the casing and configured to discharge the gas to the outside. The combustor may include a fuel nozzle disposed on a nozzle tube, a center body disposed at a center of the fuel nozzle and connected to a fuel nozzle base, and a plurality of swirlers circumferentially spaced apart from each other between the center body and the fuel nozzle, wherein the swirler may include a fuel manifold configured to have an enlarged fuel inlet portion.

Each of the swirler may include a swirler body disposed between an inner surface of the fuel nozzle and an outer surface of the center body, a fuel injection hole disposed on the swirler body, the fuel manifold formed in the swirler body and configured to be connected to a fuel channel disposed in the center body, and a turbulence alleviator formed at the fuel inlet of the fuel manifold to alleviate creation of turbulence of fuel flowing from the fuel channel to the fuel manifold.

The turbulence alleviator may include an inclined portion formed at the fuel inlet of the fuel manifold so that a flow space of the fuel is gradually enlarged from the fuel channel to the fuel manifold.

The turbulence alleviator may include a curved portion formed at the fuel inlet of the fuel manifold so that a flow space of the fuel is gradually enlarged from the fuel channel to the fuel manifold.

The fuel injection hole may have an elongated hole shape extending in a direction of flow of compressed air.

BRIEF DESCRIPTION OF THE DRAWINGS

The above and other aspects will become more apparent from the following description of the exemplary embodiments with reference to the accompanying drawings, in which:

FIG. 1 is a view illustrating a fuel manifold space structure within each swirler according to the related art;

FIG. 2 is a side cross-sectional view illustrating an overall structure of a gas turbine according to an exemplary embodiment;

FIG. 3 is a perspective cross-sectional view illustrating an overall structure of a combustor according to an exemplary embodiment;

FIG. 4 is a view structurally illustrating a fuel manifold within each swirler according to a first exemplary embodiment;

FIG. 5 is a view structurally illustrating a fuel manifold within each swirler according to a second exemplary embodiment;

DETAILED DESCRIPTION

Figure 6:
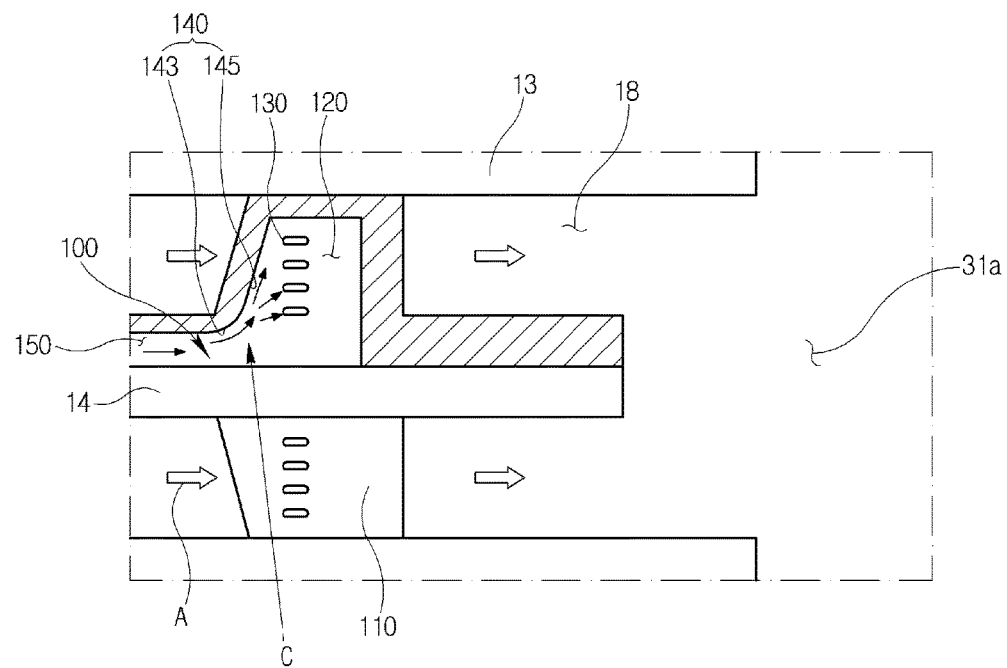
FIG. 6 is a view structurally illustrating a fuel manifold within each swirler according to a third exemplary embodiment.

Various modifications may be made to the embodiments of the disclosure, and there may be various types of embodiments. Thus, specific embodiments will be illustrated in the accompanying drawings and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well, unless the context clearly indicates otherwise. In this specification, terms such as "comprise", "include", or "have/has" should be construed as designating that there are such features, integers, steps, operations, elements, components, and/or a combination thereof in the specification, not to exclude the presence or possibility of adding one or more of other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a swirler with a fuel manifold, and a combustor and gas turbine including the same according to exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 2 is a side cross-sectional view illustrating an overall structure of a gas turbine 1 according to an exemplary embodiment. Referring to FIG. 2, the gas turbine 1 may include a casing 2, a compressor section 4 configured to compress air, a combustor 10 configured to combust a mixture of fuel with the compressed air, a turbine section 6 configured to generate power using combustion gas, a diffuser 7 configured to discharge exhaust gas, and a rotor 3 configured to connect the compressor section 4 and the turbine section 6 to transmit rotational power.

Thermodynamically, an outside air is introduced into the compressor section disposed upstream of the gas turbine for an adiabatic compression process. The compressed air is supplied to the combustor to be mixed with fuel therein for an isobaric combustion process. The combustion gas is supplied to the turbine section disposed downstream of the gas turbine for an adiabatic expansion process.

Based on a direction of an air flow, the compressor section 4 is disposed in front of the casing 2 and the turbine section 6 is disposed in a rear of the casing 2.

A torque tube 3b serving as a torque transfer member for transferring the torque generated in the turbine section 6 to the compressor section 4 is disposed between the compressor section 4 and the turbine section 6.

The compressor section 4 includes a plurality of compressor rotor disks 4a, each of which is fastened by a tie rod 3a to prevent axial separation in an axial direction of a tie rod 3a.

The compressor rotor disks 4a are arranged in the axial direction in a state in which the tie rod 3a extends through the central holes of the compressor rotor disks 4a. In the vicinity of the outer peripheral portion of each of the compressor rotor disks 4a, a flange (not illustrated) protrudes axially and is coupled to an adjacent rotor disk so as not to be rotatable relative thereto.

Each of the compressor rotor disks 4a may include a plurality of blades 4b (or referred to as buckets) radially coupled to the outer peripheral surface thereof. Each of the blades 4b has a dovetail (not illustrated) and is fastened to the compressor rotor disk 4a therethrough.

Examples of fastening through the dovetail may include a tangential type and an axial type, which may be selected according to the structure required for the gas turbine used. In some cases, the compressor blades 4b may be fastened to the compressor rotor disk 4a by using other types of fasteners, such as, a key or a bolt.

A plurality of compressor vanes (or referred to as diaphragms) fixed to the inner circumferential surface of the casing 2 are positioned between each of the compressor rotor disks 4a. While the compressor rotor disks 4a rotate along with a rotation of the tie rod 3a, the compressor vanes fixed to the casing 2 do not rotate.

The tie rod 3a is installed to extend through the center of the compressor rotor disks 4a. One end of the tie rod 3a is fixed to the most upstream compressor rotor disk 4a, and the other end thereof is fixed in the torque tube 3b.

It is understood that the type of the tie rod 3a may not be limited to the example illustrated in FIG. 2, and may be changed or vary according to one or more other exemplary embodiments.

For example, there are three types of tie rods: a single-type in which a single tie rod extends through the center of the compressor rotor disks; a multi-type in which multiple tie rods are arranged in a circumferential direction; and a complex type in which the single-type and the multi-type are combined.

In order to increase the pressure of a fluid in the compressor section of the gas turbine and then adjust the angle of flow of the fluid, entering into an inlet of the combustor, to a design angle of flow, a deswirler serving as a guide vane may be installed next to the diffuser 7.

The combustor 10 mixes the introduced compressed air with fuel and combusts the mixture to produce high-temperature and high-pressure combustion gas with high energy. The temperature of the combustion gas is increased to a heat-resistant limit of the components of the combustor 10 and turbine section 6 through an isobaric combustion process.

The combustion system of the gas turbine may include a plurality of combustors 10 arranged in the casing 2 in a form of a cell.

In the turbine section 6, the high-temperature and high-pressure combustion gas discharged from the combustor 10 applies impingement or reaction force to the blades of the turbine section 6 while expanding, resulting in mechanical energy.

Some of the mechanical energy obtained in the turbine section 6 is provided as energy required for compression of air in the compressor section 4, and the remainder is used to produce electric power for driving a generator.

The turbine section 6 may include a plurality of stators and rotors alternately arranged therein, and the rotors are driven by combustion gas to rotate the output shaft connected to the generator.

To this end, the turbine section 6 includes a plurality of turbine rotor disks 6a. Each of the turbine rotor disks 6a has a structure similar to the compressor rotor disk 4a.

Each of the turbine rotor disks 6a also has a flange (not illustrated) provided for coupling with an adjacent turbine rotor disk 6a, and includes a plurality of turbine blades 6b (or referred to as buckets) arranged radially. The turbine blades 6b may also be coupled to the turbine rotor disk 6a in a dovetail manner.

In the casing 2, vanes (or referred to as diaphragms) rotating relative to the turbine blades 6b may be mounted on the inner peripheral surface of the turbine section 6.

In the gas turbine having the above-described structure, after the air introduced into the compressor section 4 is compressed therein and combusted in the combustor 10, the combustion gas flows to the turbine section 6 to drive the generator and is discharged to the atmosphere through the diffuser 7.

Here, the rotating component such as the tie rod 3a, the torque tube 3b, the compressor rotor disk 4a, the compressor blade 4b, the turbine rotor disk 6a, and the turbine blade 6b may be collectively referred to as a rotor or a rotating unit. The non-rotating component such as the casing 2, the vane (not illustrated), and the diaphragm (not illustrated) may be collectively referred to as a stator or a fixed unit.

FIG. 3 illustrates the structure of the combustor 10 applied to the gas turbine 1. The combustor 10 may include a burner casing 11 configured to surround a plurality of fuel nozzles 18 (e.g., fuel nozzles 15 and 17) of a burner 10a, a liner 31 configured to define a combustion chamber 31a, a transition piece 33 serving as a connector between the combustor 10 and the turbine section 6, and a flow sleeve 35 configured to annularly surround the liner 31 and the transition piece 33.

Referring to FIG. 3, the liner 31 provides the combustion chamber 31a in which the fuel injected by the fuel nozzles 15 and 17 is mixed with the compressed air supplied from the compressor section for combustion. The liner 31 may be cooled by the compressed air flowing through a compressed air channel 32 that is an annular space defined by the flow sleeve 35 on the outer periphery of the liner 31. The fuel nozzles 15 and 17 are coupled to the front end of the liner 31.

The transition piece 33 is connected to the rear end of the liner 31 to transfer the combustion gas, burned by an ignition plug, to the turbine section. The liner 31 and the transition piece 33 are cooled by the compressed air supplied to annular spaces, that is compressed air channels 32 and 34, defined by the flow sleeve 35 surrounding the liner 31 and the transition piece 33 to prevent the liner 31 and the transition piece 33 from being damaged due to the high temperature of the combustion gas.

The fuel nozzles 18 are annularly surrounded by the burner casing 11, which functions as a housing, and are connected to the liner 31. A cylindrical member having a plurality of openings may be inserted into the connection between the fuel nozzles 18 and the liner 31. The cylindrical member may be a nozzle tube 13 including the fuel nozzles 18. The openings formed in the nozzle tube 13 function as the fuel nozzles 18 which may include a central nozzle 17 and a plurality of peripheral nozzles 15 surrounding the central nozzle 17.

Each of the fuel nozzles 18 surrounds a center body 14 extending in a forward direction and a backward direction of the combustor in a center of the cylindrical fuel nozzle 18. The center body 14 may be connected, at one end thereof, to a nozzle base 12 to be supplied with fuel therefrom, and the fuel may be injected through swirlers 100 and/or fuel injection openings (not illustrated) formed around the center body 14 to mix with compressed air. The swirlers 100 may be circumferentially spaced apart from each other between each of the center bodies 14 and an associated one of the fuel nozzles 18. In FIG. 3, the fuel injection openings are formed on the swirlers 100. It is understood that the positions and shapes of the fuel nozzles to which fuel is supplied may not be limited to the example illustrated in FIG. 3, and may be changed or vary according to one or more other exemplary embodiments.

For example, the nozzle base 12 may be connected to an end cover 22 which may be configured to be at least partially supplied with fuel.

FIG. 4 is a view structurally illustrating a fuel manifold 120 within each swirler 100 according to a first exemplary embodiment. FIG. 5 is a view structurally illustrating a fuel manifold 120 within each swirler 100 according to a second exemplary embodiment.

Referring to FIG. 4, the swirler 100 may include a swirler body 110, a fuel injection hole 130, a fuel manifold 120, and a turbulence alleviator 140.

The swirler body 110 may be disposed between an inner surface of the fuel nozzle 18 and an outer surface of the center body 14. For example, the swirler body 110 may be curved with a constant curvature to allow compressed air A to be swirled and supplied to the combustion chamber 31a.

The fuel injection hole 130 may include a plurality of fuel injection holes arranged on the swirler body 110. The fuel injection hole 130 may be an elongated hole extending in a direction of flow of the compressed air A such that fuel C is stably injected through the fuel injection hole 130.

In the center body 14, a fuel channel 150 is disposed to be supplied with the fuel C from the nozzle base 12. The fuel manifold 120 is formed in the swirler body 110 and is connected to the fuel channel 150 while communicating with the plurality of fuel injection holes 130. Thus, the fuel C supplied from the fuel channel 150 is distributed to the fuel injection holes 130 in the fuel manifold 120 and is injected out of the swirler 100.

The turbulence alleviator 140 may be formed at a fuel inlet of the fuel manifold 120 to alleviate a creation of turbulence of the fuel flowing from the fuel channel 150 to the fuel manifold 120.

Here, the turbulence alleviator 140 may have an inclined portion 141 formed at the fuel inlet of the fuel manifold 120 so that a flow space of the fuel C is gradually enlarged from the fuel channel 150 to the fuel manifold 120.

In the related art of FIG. 1, severe turbulence may be created at the entry portion B of the fuel manifold space during the inflow of the fuel C due to an angular entry portion B. However, a stable flow of the fuel C is possible in the first exemplary embodiment by the inclined portion 141 being formed to reduce a portion that causes a collision and flow interruption of the fuel C flowing from the fuel channel 150 to the fuel manifold 120 and to gradually enlarge a flow area toward the fuel manifold 120, as illustrated in FIG. 4. The turbulence alleviator 140 minimizes the creation of turbulence of the fuel C when the fuel C enters the fuel manifold 120, and enables the fuel C to stably flow into the fuel injection hole 130.

Referring to FIG. 5, a turbulence alleviator 140 may have a curved portion 143 formed at the fuel inlet of a fuel manifold 120 so that a flow space of fuel C is gradually enlarged from the fuel channel 150 to the fuel manifold 120. Thus, the fuel C smoothly enters the fuel manifold 120 along the curved portion 143.

That is, the curved portion 143 reduces a portion that causes the collision and flow interruption of the fuel C flowing from the fuel channel 150 to the fuel manifold 120 and enables the fuel C to smoothly enter the fuel manifold 120. Further, a stable flow of the fuel C is also possible because the curved portion 143 gradually enlarges a flow area toward the fuel manifold 120. The turbulence alleviator 140 minimizes the creation of turbulence of the fuel C when the fuel C enters the fuel manifold 120, and enables the fuel C to stably flow into the fuel injection hole 130 together with stable injection therethrough.

FIG. 6 is a view structurally illustrating a fuel manifold 120 within each swirler 100 according to a third exemplary embodiment.

Referring to FIG. 6, the swirler 100 may include a swirler body 110, a fuel injection hole 130, a fuel manifold 120, and a turbulence alleviator 140.

The swirler body 110 may be disposed between the inner surface of the fuel nozzle 18 and the outer surface of the center body 14. For example, the swirler body 110 may be curved with a constant curvature to allow compressed air A to be swirled and supplied to the combustion chamber 31a.

The fuel injection hole 130 may include a plurality of fuel injection holes arranged on the swirler body 110. The fuel injection hole 130 may be an elongated hole extending in the direction of flow of the compressed air A such that fuel C is stably injected through the fuel injection hole 130.

In the center body 14, a fuel channel 150 is disposed to be supplied with the fuel C from the nozzle base 12. The fuel manifold 120 is formed in the swirler body 110 and is connected to the fuel channel 150 while communicating with the plurality of fuel injection holes 130. Thus, the fuel C supplied from the fuel channel 150 is distributed to the fuel injection holes 130 in the fuel manifold 120 and is injected out of the swirler 100.

The turbulence alleviator 140 may be formed in the fuel manifold 120 to alleviate the creation of turbulence of the fuel C flowing from the fuel channel 150 to the fuel manifold 120.

Here, the swirler body 110 includes an upper portion extending from the inner surface of the fuel nozzle 18 to the outer surface of the center body 14 in a direction opposite to the combustion chamber 31a, based on the direction of flow of the compressed air A. The turbulence alleviator 140 may include an inclined blade portion 145 inclined in a direction of extension of the upper portion of the swirler body 110, thereby allowing the fuel C flowing from the fuel channel 150 to the fuel manifold 120 to be diffused without the creation of turbulence and distributed and introduced into the fuel injection holes 130.

That is, the inclined blade portion 145 is configured such that the fuel C more stably flows from the fuel channel 150 to the fuel manifold 120. Accordingly, the fuel inlet of the fuel manifold 120 is enlarged, which reduces a portion that causes the collision of the fuel C during inflow and thus reduces the creation of turbulence of the fuel C. Therefore, the fuel C is stably distributed to the fuel injection holes 130.

In addition, the turbulence alleviator 140 may further include a curved portion 143 formed at the fuel inlet of the fuel manifold 120 so that a flow space of fuel C is gradually enlarged from the fuel channel 150 to the fuel manifold 120. Thus, the fuel C smoothly enters the fuel manifold 120 along the curved portion 143.

The curved portion 143 reduces a portion that causes the collision and flow interruption of the fuel C flowing from the fuel channel 150 to the fuel manifold 120 and gradually enlarges a flow area toward the fuel manifold 120. Therefore, the fuel C stably flows so that the creation of turbulence of the fuel C is minimized.

Figure 7:
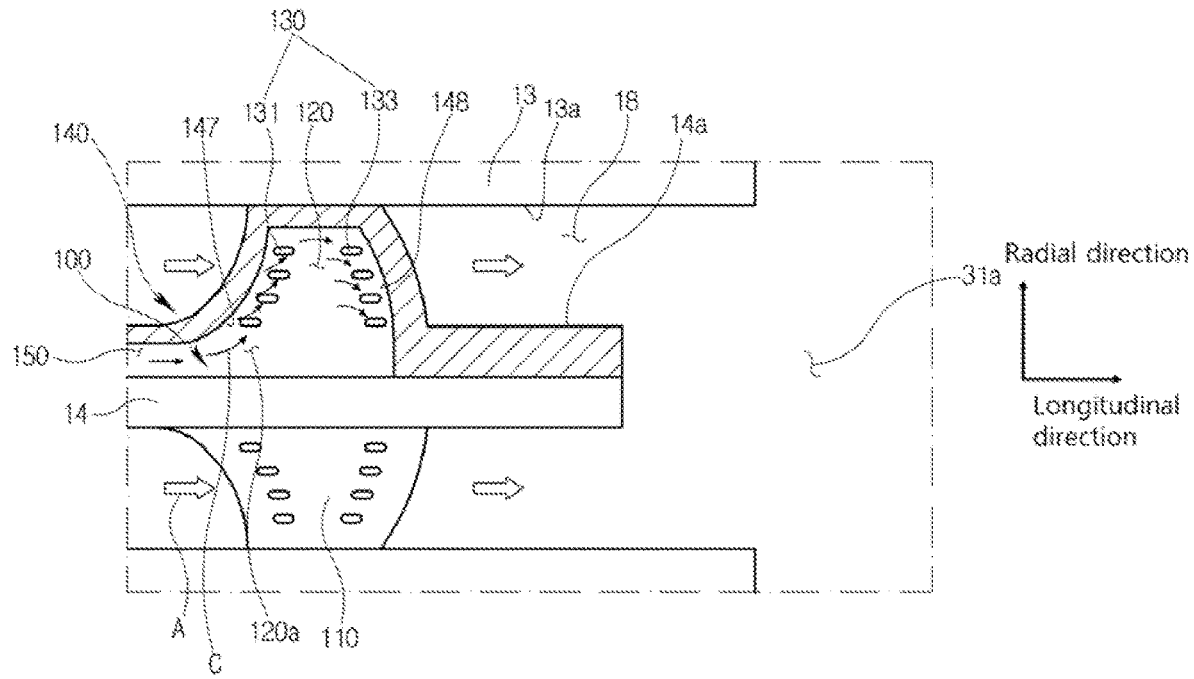
FIG. 7 is a view structurally illustrating a fuel manifold within each swirler according to a fourth exemplary embodiment.

FIG. 7 is a view structurally illustrating a fuel manifold 120 within each swirler 100 according to a fourth exemplary embodiment.

Referring to FIG. 7, the swirler 100 may include a swirler body 110, a fuel injection hole 130, a fuel manifold 120, and a turbulence alleviator 140. Because the swirler body 110, the fuel injection hole 130, the fuel manifold 120, and the turbulence alleviator 140 are similar to those described in FIG. 6, only a different configuration will be described below.

In the swirler 100, the fuel injection hole 130 may include first injection holes 131 disposed in an upper portion of the fuel manifold 120 and second injection holes 133 disposed in a lower portion of the fuel manifold 120, based on the direction of flow of the fuel C.

Based on the direction of flow of the fuel C, the swirler body 110 may have an upper portion extending from the inner surface 13a of the fuel nozzle 18 to the outer surface of the center body 14 in a direction opposite to the combustion chamber 31a, and a lower portion extending from the inner surface 13a of the fuel nozzle 18 to the outer surface 34a of the center body 14 in a direction toward the combustion chamber 31a.

The turbulence alleviator 140 may include a first curved blade portion 147 and a second curved blade portion 148.

The first curved blade portion 147 may be curved in a direction of extension of the upper portion of the swirler body 110, thereby allowing the fuel C flowing from the fuel channel 150 to the fuel manifold 120 to be diffused without the creation of turbulence and distributed to the first injection holes 131.

The second curved blade portion 148 may be curved in a direction of extension of the lower portion of the swirler body 110, thereby allowing the fuel C flowing from the upper portion of the fuel manifold 120 to the lower portion of the fuel manifold 120 to be diffused without the creation of turbulence and distributed to the second injection holes 133.

Through the above-described structure, the fuel C is smoothly introduced into the fuel manifold 120 along the first curved blade portion 147 and stably distributed to the first set of injection holes 131. This is because the first curved blade portion 147 gradually enlarges a flow space 120a of the fuel C from the fuel channel 150 to the fuel manifold 120 so that the collision of the fuel C does not occur to significantly reduce the creation of turbulence.

In addition, some of the fuel C that has passed through the first curved blade portion 147 is injected out of the swirler 100 through the first injection holes 131, and the remaining fuel C smoothly flows along the second curved blade portion 148 and is distributed to the second injection holes 133. Because the fuel C smoothly flows due to the curved shape of the first and second curved blade portions 147 and 148, the creation of turbulence can be significantly reduced and the fuel C can be stably injected.

As described above, because the swirler 100 according to the exemplary embodiments is designed such that the fuel C is introduced into the fuel manifold 120 while the creation of turbulence is minimized, it is possible to stably inject the fuel C and improve a degree of mixing of fuel and air. Thus, it is possible to increase combustion efficiency.

According to the exemplary embodiments, by improving the entry portion of the fuel manifold space defined in each swirler and minimizing the creation of turbulence in the fuel manifold space so that the fuel can enter the fuel manifold space, it is possible to stably inject the fuel through the fuel injection holes of the swirler and to contribute to an improvement in combustion efficiency as well as ensuring a degree of mixing of fuel and air.

While exemplary embodiments have been described with reference to the accompanying drawings, it is to be understood by those skilled in the art that various changes and modifications in form and details may be made therein without departing from the spirit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A swirler comprising:
   a center body having a longitudinal axis and a swirler body extending radially outward from the center body in a radial direction perpendicular to the longitudinal axis, wherein a compressed air flows in a direction along the longitudinal axis toward a combustion chamber;
   a first set of fuel injection holes and a second set of fuel injection holes disposed on the swirler body;
   a fuel manifold formed in the swirler body and connected to a fuel channel disposed in the center body, the fuel manifold communicating with both of the first set of fuel injector holes and the second set of fuel injection holes; and a turbulence alleviator at least partially defines the fuel manifold in order to alleviate creation of turbulence of a fuel flowing from the fuel channel to the fuel manifold via a flow space;

wherein the turbulence alleviator comprises a first curved blade portion defining an upstream portion of the fuel manifold along the longitudinal axis, such that the flow space is gradually enlarged from the fuel channel to the fuel manifold, thereby allowing the fuel flowing from the fuel channel to smoothly enter the fuel manifold with minimized creation of turbulence and to diffuse to the first set of fuel injection holes while flowing radially outward in the radial direction; and the turbulence alleviator further comprises a second curved blade portion defining a downstream portion of the fuel manifold along the longitudinal axis and curvedly extending radially outward in the radial direction, such that the second curved blade portion forms a continuously curved line extending from a radially inner end position of the second curved blade portion to a radially outer end position of the second curved blade portion, and the radially inner end position of the second curved blade portion is located downstream from the radially outer end position of the second curved blade portion along the longitudinal axis, thereby allowing at least a portion of a remaining fuel that is not diffused at the first set of fuel injection holes to diffuse to the second set of fuel injection holes while smoothly flowing along the downstream portion of the fuel manifold.

2. The swirler according to claim 1, wherein the first set of fuel injection holes is disposed at the upstream portion of the fuel manifold relative to the longitudinal axis.

3. The swirler according to claim 2, wherein the second set of fuel injection holes is disposed at the downstream portion of the fuel manifold relative to the longitudinal axis.

4. The swirler according to claim 1, wherein each fuel injection hole of the first set of fuel injection holes and the second set of fuel injection holes is an elongated hole extending in the direction along the longitudinal axis toward the combustion chamber.

5. The swirler according to claim 1, wherein a radially outer end position of the first curved blade portion and the radially outer end position of the second curved blade portion are spaced apart from each other along the longitudinal axis.

* * * * *